(12) United States Patent
Palsgaard et al.

(10) Patent No.: US 9,510,560 B2
(45) Date of Patent: Dec. 6, 2016

(54) MOTORIZED FEEDING VEHICLE

(71) Applicant: DANSK MINK PAPIR, Holstebro (DK)

(72) Inventors: Henrik Palsgaard, Aalborg (DK); Johnny Mollerup Larsen, Aalborg (DK); Rudi Pedersen, Herning (DK)

(73) Assignee: DANSK MINK PAPIR A/S, Holstebro (DK)

( * ) Notice: Subject to any disclaimer, the term of this patent is extended or adjusted under 35 U.S.C. 154(b) by 0 days.

(21) Appl. No.: 14/555,655

(22) Filed: Nov. 27, 2014

(65) Prior Publication Data

US 2015/0149050 A1 May 28, 2015

(30) Foreign Application Priority Data

Nov. 27, 2013 (EP) ..................................... 13194613

(51) Int. Cl.
*A01K 5/00* (2006.01)
*A01K 5/02* (2006.01)
*G05D 1/02* (2006.01)

(52) U.S. Cl.
CPC ............... *A01K 5/00* (2013.01); *A01K 5/0266* (2013.01); *A01K 5/0275* (2013.01); *G05D 1/0221* (2013.01); *G05D 1/0278* (2013.01); *G05D 2201/0201* (2013.01)

(58) Field of Classification Search
CPC ........ A01K 5/00; A01K 5/02; A01K 5/0266; A01K 5/0275; G05D 1/0221
See application file for complete search history.

(56) References Cited

U.S. PATENT DOCUMENTS 5,424,957 A * 6/1995 Kerkhoff ............... A01K 5/0275
119/51.02
7,689,434 B2 3/2010 Cureton et al.
2002/0121244 A1 * 9/2002 van den Berg ...... A01K 5/0275
119/56.1
2005/0257748 A1 * 11/2005 Kriesel ............... A01K 11/008
119/51.02

(Continued)

FOREIGN PATENT DOCUMENTS

CN 201426302 Y 3/2010
CN 201690880 U 1/2011

(Continued)

OTHER PUBLICATIONS

Search Report from European Patent Office on co-pending EP application (EP13194613.9) dated Mar. 26, 2014.

*Primary Examiner* — Jerrah Edwards
*Assistant Examiner* — Tamara Weber
(74) *Attorney, Agent, or Firm* — Klein, O'Neill & Singh, LLP

(57) ABSTRACT

An animal feeding vehicle includes a movement control system, a GPS receiver for generating a first set of parameters including location information, a proximity sensor for generating a second set of parameters including spatial information, a position sensor for generating a third set of parameters including motion information, a feeding system including a feeding control system for feeding animals based on a fourth set of parameters. A control unit receives the first, second, third, and fourth sets of parameters, and defines a first mode in which the user controls the movement control system and the feeding control system, and in which the control unit records data representing the first, second, third, and fourth sets of parameters; and a second mode in which the control unit controls the movement control system and the feeding system by comparing recorded data with the first, second, third, and fourth sets of parameters.

14 Claims, 9 Drawing Sheets

(56) References Cited

U.S. PATENT DOCUMENTS

| | | | |
|---|---|---|---|
| 2007/0288249 A1 | 12/2007 | Rowe et al. | |
| 2008/0236509 A1* | 10/2008 | Van Den Berg | A01K 9/00 119/475 |
| 2010/0161225 A1 | 6/2010 | Hyung et al. | |
| 2010/0289617 A1* | 11/2010 | Hill | G01V 15/00 340/5.61 |
| 2010/0326363 A1* | 12/2010 | Van Den Berg | A01K 1/105 119/57.92 |
| 2011/0185975 A1* | 8/2011 | Van Den Berg | A01K 1/01 119/57.92 |
| 2012/0319858 A1* | 12/2012 | Tas | G08B 25/12 340/686.6 |
| 2015/0034014 A1* | 2/2015 | Van Kuilenburg | A01K 5/02 119/51.01 |
| 2015/0230427 A1* | 8/2015 | Wisse | A01K 5/02 701/2 |

FOREIGN PATENT DOCUMENTS

| | | |
|---|---|---|
| CN | 201733700 U | 2/2011 |
| CN | 202697443 U | 1/2013 |
| CN | 103004626 A | 4/2013 |
| CN | 203015614 U | 6/2013 |
| DK | 176138 | 9/2006 |
| DK | 176402 | 11/2007 |
| DK | 177406 | 4/2013 |
| DK | 177425 | 5/2013 |
| EP | 0366350 | 5/1990 |
| EP | 0739161 | 3/2002 |
| EP | 2169505 | 3/2010 |
| EP | 2124528 | 5/2011 |
| EP | 2334169 | 5/2013 |
| GB | 1564197 | 4/1980 |
| NL | 1020093 | 9/2003 |
| NL | 1035687 | 1/2010 |
| WO | WO2008/101500 | 8/2008 |
| WO | WO2013/157928 | 10/2013 |

\* cited by examiner

MOTORIZED FEEDING VEHICLE

CROSS-REFERENCE TO RELATED APPLICATION

This application claims priority to European Patent Application No. 13194613.9, filed on Nov. 27, 2013. The priority application is incorporated herein by reference in its entirety.

TECHNICAL FIELD

The present invention relates to a motorized feeding vehicle, an animal farming system and a method of operating an animal farming system.

BACKGROUND

In relation to animal farming, in particular furred animal farming such as mink farming, the animals are typically kept in a building or shed in which the animals are accommodated either in individual cages, or with a small number of animals in each cage. The word "cage" should be understood to encompass also similar enclosures for animals. The building typically has a roof and walls, however, it may also have an at least partially open structure. The cages are typically positioned on each side of a passage through the building. In small farms the animals may be fed manually; however, in larger farms, the feeding of the animals is performed by using a motorized feeding vehicle.

The motorized feeding vehicle may comprise a chassis, a driver position, a movement control system, a power system, a steering system and an animal feeding system. The feeding system comprises a feed storage tank and a pipe for delivering the animal feed directly on the cages. The feed is typically provided in a flowable form. The user thus drives into the building and adjacent a cage such that the pipe is located above the cage and then operates a pump or delivery system for delivering a user determined amount of feed for the individual animal.

The operation of such motorized feeding vehicles is very monotonous work since it involves driving to a cage, operating the feeding system, driving to the next cage, and so on. Further, the feeding must be repeated several times every day at the times when the animals should be fed. Thus, in the prior art there has been committed significant work for developing technologies for allowing the motorized feeding vehicle to be automatically controlled. Some of the prior art technologies are described below:

The German patent application DE 10 2006 037 232 A1 describes a navigation system for a vehicle which has an internal wireless reader which may read location data from transponders positioned in the same area as the vehicle.

The Danish patent DK 176 402 B1 describes a fully automatic feeding vehicle, which may move automatically along a predetermined path by the aid of a wireless positioning system, such as a GPS system.

The Danish patent DK 177 425 B1 describes a feeding vehicle having a navigation system, which measures the angular rotation of a wheel and calculates the distance which the feeding vehicle has moved based on the radius and the angular movement of the wheel.

The Danish patent DK 177 406 B1 describes a feeding vehicle having a feeding pipe divided into two pipe sections and a servo motor for moving the feeding pipe.

The European patent application EP 366 350 A2 describes a vehicle for primarily unmanned operation equipped with an upwardly pointing video camera which during a manually driven learning mode observes overhead features which during a subsequent unmanned trip are used for guidance.

The Dutch patent NL 1020093 relates to an autonomous vehicle having a detector for detecting floor markings.

The Dutch patent NL 1035687 relates to an unmanned vehicle having a control system using sensors or GPS. The sensors of the control system may be slides or land-marks in the surroundings in which the vehicle is used.

The United Stated patent application US 2010/0161225 A1 relates to a method of building map information using a 3D camera for localization.

The international patent application WO 2008/101500 A1 relates to a system for feeding fur animals in which an unmanned motorized feed cart is guided along a guide wire. The document also describes the use of RFID tags.

The European patent EP 2 124 528 B1 relates to an unmanned vehicle for supplying feed to an animal and having a sensor for forming an image of an observation area.

The Chinese utility model CN 203015614 U describes an automatic feeding machine for fur-bearing animals having a feed hopper and a feed pump.

The Chinese utility model CN 202697443 U describes an automatic feeding machine comprising a seat and a steering wheel.

The Chinese utility model CN 201426302 Y describes an automatic feeding machine comprising a hydraulic motor and a hydraulic pump.

The Chinese utility model CN 201690880 U describes an automatic feeding machine having a hopper and a feed conveying device.

The Chinese utility model CN 2017337000 relates to a small sized three wheeled vehicle having a handlebar type steering device.

The Chinese application CN 103004626A relates to a machine for distributing feeding meat to animals having a power device that is fixedly connected to a gear shaft provided with a meshed gear pump and discharging pipe that is connected with the bottom of a storage hopper arranged with a feeding port.

The European patent EP 0 739 161 B1 relates to a feed wagon moving between feed loading stations by means of a detection device for the detection of passive beacons or a wire.

The European patent EP 2 334 169 B1 relates to an unmanned vehicle having a protective device in the form of an electrical conductor for protecting the vehicle against obstacles such as animal legs.

The U.S. Pat. No. 7,689,434 B1 relates to an animal feeding system comprising a vehicle having a GPS system.

The U.S. Pat. No. 5,424,957 relates to a control and monitoring system mount in a feed truck which detects whether feed remains in the bunks from prior feedings.

The Danish patent 176 138 B1 relates to a method of increasing the fertility of female animals by automatic individual feeding of the animals.

GB 1 564 197 relates to a fodder distribution system comprising a row of individual troughs and a fodder distribution vehicle which is movable along the row.

US 2007/0288249 relates to a system comprising at least one device for measuring one or more parameters of individual animals, the data being used to determine management strategies for individual animals in real-time.

The automatic feeding vehicles mentioned in the above mentioned documents allow for an automatic feeding of caged animals without the direct involvement of a user. In order to allow the feeding vehicle to navigate without the need of user involvement, it is necessary for the feeding vehicle to comprise a navigation system. The navigation systems used in the above mentioned prior art documents may basically be divided into global navigation systems, such as GPS, local navigation systems, such as RFID tags or cameras; and onboard navigation systems, such as an onboard distance and directional measurement.

All of the above systems have their individual advantages and drawbacks. The global navigation systems typically depend on satellites emitting high frequency radio waves which allow a very accurate localization but which cannot be accurately received indoors. Local navigation systems may be positioned both indoors and outdoors; however, they may be very sensitive to dust, rain, snow, and similar environmental influence. Onboard navigation systems have the inherent drawback that a well determined starting position is required, and any navigation error thereafter is cumulative and thus increases over time and distance from the well-defined starting point.

Some navigation systems depend on beacons or electric wires which are installed on the premises of the animal farming system. Such navigation systems may provide a high location accuracy by utilizing a method such as triangulation for position; however, such systems require high investments to be made in order to install the system. There is, however, a need for accurate location systems which may be used directly in an existing animal farming system without having to invest in new infrastructure.

Thus, all of the above described feeding vehicles suffer from a risk of failure in the navigation system. Such failure should be avoided since it will require user involvement. Therefore, the object of the present invention is to find a technology which allows for a more secure and fail-safe navigation of a motorized feeding vehicle while keeping the investment in the animal farming system low.

SUMMARY

The above object together with numerous other objects which are evident from the detailed description of the present invention are obtained according to a first aspect of the present invention by a motorized feeding vehicle for an animal farming system, the animal farming system comprising a field having a building accommodating a plurality of cages, each cage adapted for accommodating one or more animals, preferably a furred animal, most preferably a mink, the motorized feeding vehicle comprising:

a power system for driving the motorized feeding vehicle,
a steering system for determining a direction of the motorized feeding vehicle,
a user operated movement control system for manually controlling the power system and the steering system,
a satellite navigation system receiver for generating a first set of parameters constituting location information from a satellite navigation system,
a proximity sensor for generating a second set of parameters constituting spatial information of an area adjacent said motorized feeding vehicle,
an internal position sensor comprising a direction sensor and a velocity sensor for generating a third set of parameters constituting motion information, an animal feeding system comprising a feed storage tank for storing animal feed and a feeding pipe for conveying the animal feed from the feed storage tank to the cages individually, the animal feeding system further comprising a feeding control system for controlled feeding or non-feeding the animals via the animal feeding system based on a fourth set of parameters constituting feeding parameters, and,
a control unit connected to the satellite navigation system for receiving the first set of parameters, to the proximity sensor for receiving the second set of parameters, and to said internal position sensor for receiving the third set of parameters, the control unit defining:
a first mode constituting a learn mode in which the user is controlling the motorized feeding vehicle via the user operated movement control system and the user feeding control system and the control unit continuously recording data representing the first set of parameters, the second set of parameters, the third set of parameters and the fourth set of parameters, and
a second mode constituting an autonomous mode in which the control unit is controlling the power system, the steering system and the animal feeding system by comparing the recorded data with the first set of parameters, the second set of parameters, the third set of parameters and the fourth set of parameters.

By combining three different navigation systems, namely a satellite navigation system, a proximity sensor and an internal position sensor, the location of the motorized feeding vehicle may be determined more accurately and the motorized feeding vehicle may be navigated more precisely in an autonomous mode than relying on only one or two different navigation systems. In case one or even two of the three navigation systems falls out, navigation will still be possible. Especially, if one or even two of the three navigation systems gives a non-accurate location, the error may be compensated by accurate information from the remaining navigation system(s).

The control unit may also be set up using a primary navigation system, e.g. the proximity sensor and the second set of parameters. In case the proximity sensor cannot accurately detect any objects in the nearby spatial environment, e.g. if the motorized feeding vehicle are located too far from any object, such as a wall or the like, the control unit may use the satellite navigation system receiver, i.e. the first set of parameters. When both the first and second sets of parameters are inaccurate, e.g. when navigating between cages within the building, the control unit uses the internal position sensor, i.e. the third set of parameters.

The motorized feeding vehicle is intended for navigating within and outside the building accommodating the animals. A separate maintenance shed is typically provided for the motorized feeding vehicle, in which it may be serviced and resupplied. The motorized feeding vehicle should thus by be able to navigate from the shed into the building, passing all of the cages, and thereafter returning to the maintenance shed.

The power system may comprise an electrical motor or a combustion engine for driving a set of wheels or caterpillar tracks. The steering system allows the motorized feeding vehicle to change direction by e.g. changing the direction of the wheels or the velocity of the caterpillar tracks. The power system and the steering system may be controlled by the user operated control system which may comprise pedals, steering wheel, levers etc. for controlling the steering system and the power system.

The first set of parameters constitutes location information indicating the location of the motorized feeding vehicle, e.g. coordinates such as longitude and latitude. The satellite navigation system receiver continuously generates the first set of parameters by receiving satellite information. The receiver must receive signals with sufficient signal strength from a certain number of satellites, typically at least three, in order to establish the location with high accuracy. Roofs, walls and cloudy skies may reduce the signal strength and thus make the first set of parameters less accurate.

The proximity sensor fulfills the purpose of detecting objects obstructing the motorized feeding vehicle. The proximity sensor has the dual function of a collision prevention system and a navigation system. Acting as a collision prevention system, the object may be a human being, an animal or any other larger movable article which may be damaged by or cause damage to, the motorized feeding vehicle in case of collision. Acting as a navigation system, the object may be the external and internal walls of the building of the animal farming system. When the motorized feeding vehicle is navigating in the field, the proximity sensor will normally not receive any information. When approaching the entrance of the building, the proximity sensor will allow the motorized feeding vehicle to enter and avoid collisions with the external wall of the building. When in the passage between cages, the proximity sensor will prevent collision with the cages and allow the motorized feeding vehicle to navigate along the passage. The control unit may be configured to navigate and avoid collision both in learn mode and in autonomous mode. In learn mode, the motorized feeding vehicle may generate the second set of parameters constituting spatial information indicating e.g. the width and location of the entrance and passage, whereas in the autonomous mode, the motorized feeding vehicle may use the recorded spatial information for navigation and further be caused to deviate from its derived route and make a detour about any occasional object. Further, objects may be placed in the field and along the passage to detect via the proximity sensor of the motorized feeding vehicle, e.g. as an indication of the location of a specific cage.

The internal position sensor uses the direction sensor and the velocity sensor for generating the third set of parameters constituting motion parameters. The motion parameters may be used for determining the location of the motorized feeding vehicle by deriving the location using the motion parameters from a predetermined location, e.g. the location of the maintenance shed or alternatively the location information from the first or second set of parameters. The new location of the motorized feeding vehicle is determined from the distance and direction traveled from the predetermined location. The velocity and the time traveled are typically used for determining the distance. The location may thus be established without the need of any external devices. The motion parameters may also be used directly by the control unit for navigating between two locations.

The food storage tank of the animal feeding system may be filled at the maintenance shed. The fourth set of parameters may provide information about the amount of feed to be distributed to each animal. The feed is simply pumped at or onto the cage in the right amount by the use of the feeding pipe. The feeding may be controlled by the user utilizing the feeding control system. In this way the fourth set of parameters may be recorded including e.g. the amount of feed given to a certain animal kept at a certain cage location.

The control unit is typically located in the feeding vehicle although some parts of it, such as data storage, may be located on a centralized server e.g. at the maintenance shed.

The first mode of the motorized feeding vehicle defines the learn mode in which the user is driving the motorized feeding vehicle and the data comprising the first, second, third, and fourth sets of parameters are recorded by the control unit. The control system thus continuously records the first, second, third, and fourth sets of parameters using a predetermined sampling rate, e.g. 1 sample per second or 10 samples per second or more. The user typically performs a normal feeding run using the user operated control system, e.g. drives from the maintenance shed, into the building and feeding all animals within the cages using the animal feeding system and returning to the maintenance shed. The data thus includes location information from three independent navigation systems, namely the satellite navigation system, the proximity sensor and the internal position sensor. Additionally, the data includes the feeding parameters defining the amount of feed to dispense at the specific locations of the animals. It is contemplated that the feeding parameters may be determined during learn mode, or a constant amount of feed may be given to each animal, or the amount of feed may be determined by user inputting the feeding parameters.

The second mode defines the autonomous mode. In this mode, the control system is controlling the motorized feeding vehicle essentially without user involvement. The control system uses the previously recorded data to navigate the motorized feeding vehicle from the maintenance shed, into the building and feeding all animals within the cages using the animal feeding system, and returning to the maintenance shed. When the motorized feeding vehicle is navigating by use of the control unit in the autonomous mode, the power system and steering system is controlled by the control unit. The control system may use the velocity inherently defined by the data and the sampling rate, or the velocity may be predetermined or internally defined by an internal vehicle stability system. The direction may be established by periodical course corrections based on the difference between the generated first, second, and third sets of parameters and the recorded data. The animal feeding system may also be autonomously controlled by using the recorded fourth set of parameters together with the first, second, and third sets of parameters in order to provide the correct amount of food to the correct animal in the cage.

According to a further embodiment of the first aspect, the motorized feeding vehicle comprises an electromagnetic reader for reading an identification device of each cage and/or each animal, the reader preferably being an RFID reader or an optical reader. The identification device may comprise information about the animal and of the location of the animal and/or cage within the building. Additional identification devices may be located at the entrance of the building and outside the building for providing location information only. This location information may during learn mode be recorded by a further set of parameters which may be used later during autonomous mode as additional navigation information. The reader preferably receives the information from the identification devices by the use of wireless technologies when the reader is located within a certain distance from the indemnification device. Triangulation methods may be used for fixating the location of the motorized feeding vehicle provided at least two identification devices are within range.

Preferably, an RFID tag on each of the cage and/or directly on the animals, e.g. the tails of the animals, may be used for remotely and wireless reading of the identification devices. Alternatively, an optical tag and an optical reader may be used, e.g. a barcode or QR code.

According to a further embodiment of the first aspect, the motorized feeding vehicle includes a detector for determining the amount of feed present or not present in the cage, the detector preferably being a camera or an ultrasound detector. The detector may e.g. be connected to the animal feeding system in order to determine the amount of feed to be released onto the cage. The information of remaining feed may also be used for continuously altering the fourth set of parameters such that all animals receive the proper amount of feed.

According to a further embodiment of the first aspect, the field and/or the building comprises additional identification devices for navigation. The additional identification devices may be used for navigating outside the building and through small passages, e.g. through the entrance of the building.

According to a further embodiment of the first aspect, the proximity sensor comprises a IR, radar, or laser proximity sensor, and/or a sensor for detecting objects a specific distance from the motorized feeding vehicle, preferably 0.5 m-2 m from the motorized feeding vehicle, such as 1 m from the motorized feeding vehicle. IR, radar and laser define technologies for detecting nearby objects with high accuracy. 1 m provides a suitable distance for being able to reduce the velocity of the motorized feeding vehicle and turn the vehicle.

According to a further embodiment of the first aspect, the data may be exported from the control unit and/or the data may be imported into the control unit. It is not necessary to use the same motorized feeding vehicle for performing the learn mode and the autonomous mode. The data recorded by one motorized feeding vehicle may be read into another motorized feeding vehicle, eliminating the need of performing the learn mode for every vehicle in case multiple vehicles are used in the same animal farming system.

According to a further embodiment of the first aspect, in the motorized feeding vehicle according to the description, wherein the control unit is controlling the power system and the steering system based on a weighing algorithm using the recorded data, the first set of parameters, the second set of parameters, the third set of parameters, and the fourth set of parameters, the weighing algorithm preferably being adaptive, such as a Kalman filter. The control unit may include a control algorithm for controlling the autonomous cruising of the motorized feeding vehicle based on the recorded data and the continuously received first, second third and, optionally, fourth set of parameters. An adaptive control or robust control algorithm may be used based on the first, second and third sets of parameters. The control algorithm may e.g. be based on a Kalman filter.

According to a further embodiment of the first aspect, the first set of parameters is ignored if the satellite navigation system receiver is not receiving navigation information from a sufficient number of satellites, and/or, the second set of parameters is ignored if the proximity sensor cannot detect any nearby object, and/or, the third set of parameters is ignored if an onboard accelerometer detects loss of traction of the power system of the motorized feeding vehicle. The decision whether or not to ignore a set of parameters may also be based on the factors which are known to influence the quality of the location information. A satellite navigation system receiver typically must achieve a stable connection to at least three, preferably four, satellites in order to provide reliable location information. The proximity sensor must be very close to an object in order for the proximity sensor to assume that the motorized feeding vehicle is positioned correctly and thus the spatial information cannot be considered to be correct in case the nearest objects are far away.

The internal position sensor may not be able to yield accurate motion information in case the motorized feeding vehicle drives over a small object or in case the power system looses traction. Thus, in case the onboard accelerometer detects loss of traction, the motion information may be ignored since it may be deemed to be inaccurate.

The control unit may e.g. be ignoring one set of parameters of the first set of parameters, the second set of parameters and the third set of parameters if the one set of parameters deviates in relation to the other two sets of parameters by more than a certain value, e.g. 1 m. Any one of the first, second and third sets of parameters may be inaccurate for the several reasons stated above. It may be assumed that in case one of the three sets of parameters deviates from the other two by the above distance, the set may be ignored since it is a high probability that the one deviating set of parameters is inaccurate. The control unit may thus use the remaining two sets of parameters for navigation and ignore the set of parameters deemed to be inaccurate.

According to a further embodiment of the first aspect, the feeding pipe is movable in 1 or 2 degrees of freedom, preferably in 1 rotational or translatory degree of freedom, most preferably in 1 rotational degree of freedom. In order for the motorized feeding vehicle to be able to assume a compact shape when the motorized feeding vehicle is moving within and outside the building while allowing the feeding to be accomplished in a safe way, the feeding pipe may be movable in order for the end of the feeding pipe to be positioned above the cage when the feed is released, wherein the feeding pipe may have at least 1 rotational or translational degree of freedom. In this way the motorized feeding vehicle is compact when moving in and out of the building, while during feeding the feeding pipe may be extended in order to reach in above the cages for releasing the feed onto the cages.

According to a further embodiment of the first aspect, the motorized feeding vehicle comprises a heat sensitive camera, such as an IR camera, for determining a status, such as a health status, of the animals individually.

When the animals are fed, the motorized feeding vehicle may simultaneously utilize a heat camera in order to determine whether an animal is present in the cage or not. The number of live animals may thereby be easily calculated while the animals are fed.

Further, the heat camera may monitor the health status of the animal by measuring the body temperature of the animal. The body temperature is commonly used in the veterinary science for identifying sick animals. The normal body temperature varies between species. An elevated body temperature, i.e. fever, is indicative of that the animal is affected by a disease. The control unit may record the body temperature of the animal and compare the measured body temperature with the standard body temperature. In case the difference between the measured body temperature and the standard body temperature is above a certain value, it indicates that the animal has a fever and may be affected by a disease. The animal may thereafter be removed and treated in order to avoid spreading of disease among the population of animals within the building.

Yet further, the heat camera may be used for identifying animal injuries. An injured animal may have a higher body temperature at the location of the injury. Such injured animals may also be removed and treated. The heat camera may also detect animals suffering from an unusually low body temperature.

According to a further embodiment of the first aspect, the motorized feeding vehicle comprises a surveillance camera for observing the animals and/or the motorized feeding vehicle and/or the surroundings of the motorized feeding vehicle. The surveillance camera may be used for monitoring the animals and the farm in order to detect any irregularities.

According to a further embodiment of the first aspect, the motorized feeding vehicle comprises a wireless communication unit, such as a WIFI or GSM unit, for communicating any of the first set of parameters, the second set of parameters, the third set of parameters, the fourth set of parameters and the data to a server, computer or handheld device. The sets of parameters may be communicated to a server for generating statistics of the feeding of the animals. The measured data may also be used for optimizing the feeding.

According to a further embodiment of the first aspect, the internal position sensor comprises any of an inertial navigation system, a compass, a sensor monitoring the user operated movement control system and a sensor measuring an angular rotation of the power system of the motorized feeding vehicle. The internal position sensor may e.g. determine the velocity and/or the distance traveled by the motorized feeding vehicle by measuring the number of rotations of the wheels over a time period. The direction of the motorized feeding vehicle may be determined by measuring the direction of the steering wheels. Alternatively, the direction may be determined via a compass. Yet alternatively, an inertial navigation system, such as an IMU, may be used for determining the acceleration of the motorized feeding vehicle and thereby derive the velocity and/or distance over a time period.

The above object together with numerous other objects which are evident from the detailed description of the present invention are obtained according to a second aspect of the present invention by an animal farming system comprising a field having a building accommodating a plurality of cages, each cage adapted for accommodating one or more animals, preferably a furred animal, most preferably a mink, the animal farming system comprising a motorized feeding vehicle according to the first aspect for moving within and outside the building.

It is evident that any of the further features described above in connection with the motorized feeding vehicle according to the first aspect may be used in the animal farming system according to the second aspect.

The above object together with numerous other objects which are evident from the detailed description of the present invention are obtained according to a third aspect of the present invention by a retrofit kit for a motorized feeding vehicle for an animal farming system, the animal farming system comprising a field having a building accommodating a plurality of cages, each cage adapted for accommodating one or more animals, preferably a furred animal, most preferably a mink, the motorized feeding vehicle comprising:
  a power system for driving the motorized feeding vehicle,
  a steering system for determining a direction of the motorized feeding vehicle,
  a user operated movement control system for manually controlling the power system and the steering system, and
  an animal feeding system comprising a feed storage tank for storing animal feed and a feeding pipe for conveying the animal feed from the feed storage tank to the cages individually, the retrofit kit comprising:
  a satellite navigation system receiver for generating a first set of parameters constituting location information from a satellite navigation system,
  a proximity sensor for generating a second set of parameters constituting spatial information of an area adjacent the motorized feeding vehicle,
  an internal position sensor comprising a direction sensor and a velocity sensor for generating a third set of parameters constituting motion information,
  a feeding control system for controlled feeding or non-feeding of the animals via the animal feeding system based on a fourth set of parameters constituting feeding parameters, and,
  a control unit connected to the satellite navigation system for receiving the first set of parameters, to the proximity sensor for receiving the second set of parameters, and to the internal position sensor for receiving the third set of parameters, the control unit defining:
    a first mode constituting a learn mode in which the user is controlling the motorized feeding vehicle via the user operated movement control system and the user feeding control system and the control unit continuously recording data representing the first set of parameters, the second set of parameters, the third set of parameters and the fourth set of parameters, and
    a second mode constituting an autonomous mode in which the control unit is controlling the power system, the steering system and the animal feeding system by comparing the recorded data with the first set of parameters, the second set of parameters, the third set of parameters and the fourth set of parameters.

The retrofit kit may be used for converting a non-autonomous motorized feeding vehicle to be able to be run automatically. The existing motorized feeding vehicle is expected to include at least the power system, the steering system, the user operated movement control system and the animal feeding system. The navigation systems may be added in the form of a kit. It is evident that some parts of the kit may be already included in the existing motorized feeding vehicle.

The above object together with numerous other objects which are evident from the detailed description of the present invention are obtained according to a fourth aspect of the present invention by a method of operating an animal farming system, the animal farming system comprising a field having a building accommodating a plurality of cages, each cage adapted for accommodating one or more animals, preferably a furred animal, most preferably a mink, the method comprising providing a motorized feeding vehicle, the motorized feeding vehicle comprising:
  a power system for driving the motorized feeding vehicle,
  a steering system for determining a direction of the motorized feeding vehicle,
  a user operated movement control system for manually controlling the power system and the steering system,
  a satellite navigation system receiver for generating a first set of parameters constituting location information from a satellite navigation system,
  a proximity sensor for generating a second set of parameters constituting spatial information of an area adjacent said motorized feeding vehicle,
  an internal position sensor comprising a direction sensor and a velocity sensor for generating a third set of position parameters constituting motion information, an animal feeding system comprising a feed storage tank for storing animal feed and a feeding pipe for conveying the animal feed from the feed storage tank to the cages individually, the animal feeding system further comprising a feeding control system for user controlled feeding or non-feeding of the animals via the animal feeding system and for establishing a fourth set of parameters constituting feeding parameters, and a control unit connected to the satellite navigation system for receiving the first set of parameters, to the proximity sensor for receiving the second set of parameters and to the internal position sensor for receiving the third set of parameters, the method comprising the additional steps of:

moving the motorized feeding vehicle in a first mode constituting a learn mode in which the user is controlling the motorized feeding vehicle via the user operated movement control system and the user feeding control system and the control unit continuously recording data representing the first set of parameters, the second set of parameters, the third set of parameters and the fourth set of parameters, and moving the motorized feeding vehicle in a second mode constituting an autonomous mode in which the control unit is controlling the power system, the steering system and the animal feeding system by comparing the recorded data with the first set of parameters, the second set of parameters, the third set of parameters and the fourth set of parameters.

It is evident that any of the further features described above in connection with the motorized feeding vehicle according to the first aspect may be used in the method according to the fourth aspect.

The above object together with numerous other objects which are evident from the detailed description of the present invention are obtained according to a fifth aspect of the present invention by a motorized animal status vehicle for an animal farming system, the animal farming system comprising a field having a building accommodating a plurality of cages, each cage adapted for accommodating one or more animals, preferably a furred animal, most preferably a mink, the motorized animal status vehicle comprising:

a power system for driving the motorized animal status vehicle, a steering system for determining a direction of the motorized animal status vehicle, and a heat sensitive camera, such as an IR camera, for determining a status, such as a health status, of the animals individually.

It is evident that the heat camera described above may be used in an animal status vehicle without necessarily including the navigation and feeding features.

According to a further embodiment of the fourth aspect, the motorized animal status vehicle further comprises a calculation unit for calculating the number of animals present in said animal farming system. The heat camera may be used in order to determine whether an animal is present in the cage or not. The number of live animals may thereby be easily calculated According to a further embodiment of the fourth aspect, the motorized animal status vehicle further comprises a determination unit for determining the health status of animals present in said animal farming system. Further, the heat camera may monitor the health status of the animal by measuring the body temperature of the animal. The body temperature is commonly used in the veterinary science for identifying sick animals. The normal body temperature varies between species. An elevated body temperature, i.e. fever, is indicative of that the animal is affected by a disease. The control unit may record the body temperature of the animal and compare the measured body temperature with the standard body temperature. In case the difference between the measured body temperature and the standard body temperature is above a certain value, it indicates that the animal has a fever and may be affected by a disease. The animal may thereafter be removed and treated in order to avoid spread of disease among the population of animals within the building.

Yet further, the heat camera may be used for identifying animal injuries. An injured animal may have a higher body temperature at the location of the injury. Such injured animals may also be removed and treated. The heat camera may also detect animals suffering from an unusually low body temperature.

The above object together with numerous other objects which are evident from the detailed description of the present invention are obtained according to a sixth aspect of the present invention by a method of operating an animal farming system, the animal farming system comprising a field having a building accommodating a plurality of cages, each cage adapted for accommodating one or more animals, preferably a furred animal, most preferably a mink, the method comprising providing a motorized animal status vehicle, the motorized animal status vehicle comprising:

a power system for driving the motorized animal status vehicle, a steering system for determining a direction of the motorized animal status vehicle, and a heat sensitive camera, such as an IR camera, for determining a status, such as a health status, of the animals individually, said method comprising the further steps of:

moving said motorized animal status vehicle to a specific cage of said plurality of cages, and measuring a body temperature of said animal in said specific cage.

It is evident that the method according to the fifth aspect may be used together with the motorized animal status vehicle according to the fifth aspect.

DETAILED DESCRIPTION

Figure 1:
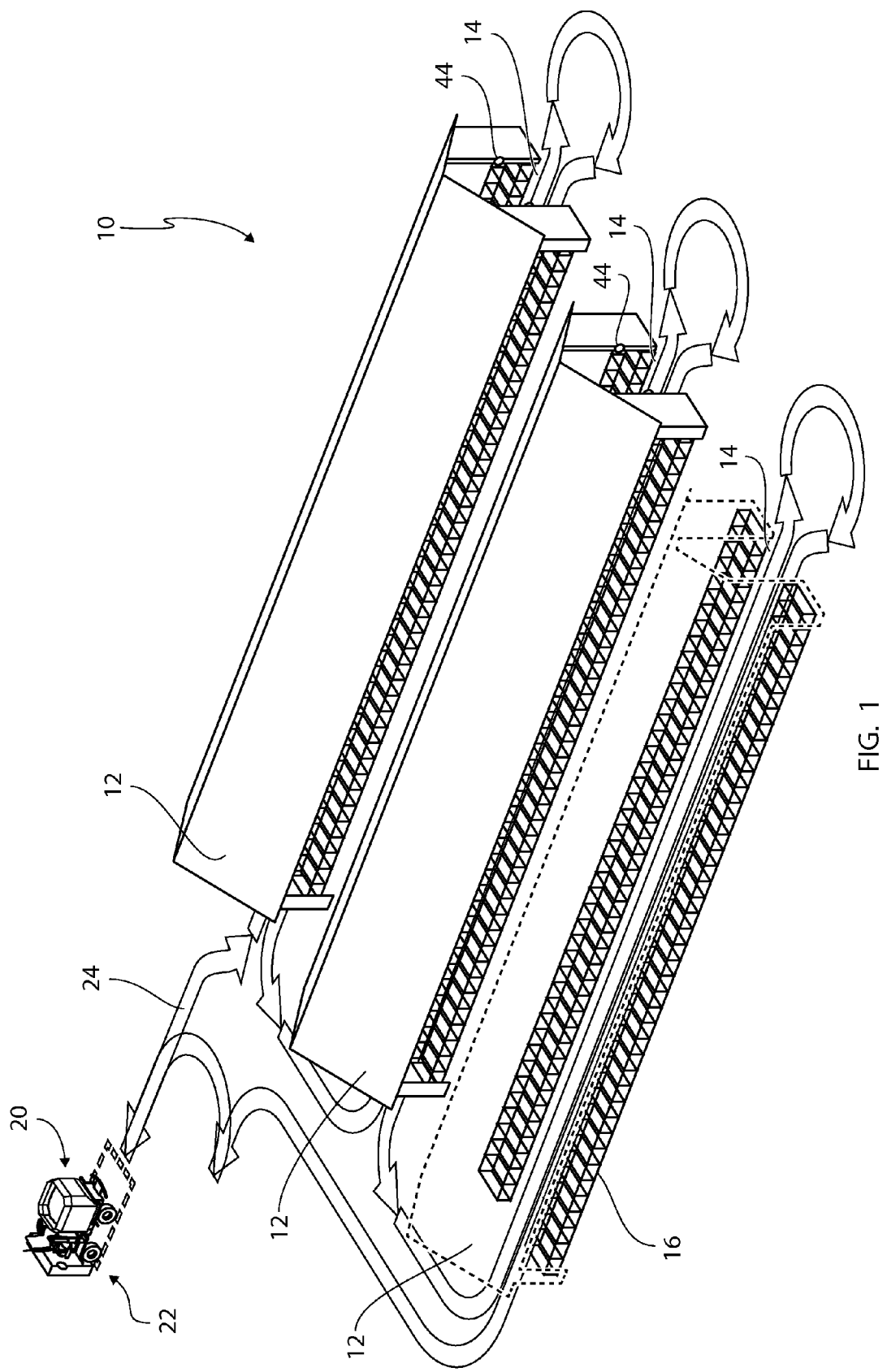
FIG. 1 is a view of an animal farming system and a motorized feeding vehicle.

FIG. 1 shows a perspective view of an animal farming system 10. The animal farming system 10 is located on a field and comprises a number of sheds or buildings 12. Each building 12 comprises a passage 14 and a plurality of cages 16 on each side of the passage 14 accessible from the passage 14. Each cage 14 comprises one or more animals (not shown), such as a furred animal, and in particular a mink. The animal farming system 10 further comprise a motorized feeding vehicle 20 initially positioned at a maintenance shed 22. The motorized feeding vehicle 20 is adapted for moving along a path 24 on the field surrounding the buildings 12 and through the buildings 12 indicated by the arrows. The motorized feeding vehicle 20 may be moved either in a learning mode or in an autonomous mode, which both will be explained in detail below.

Figure 2A:
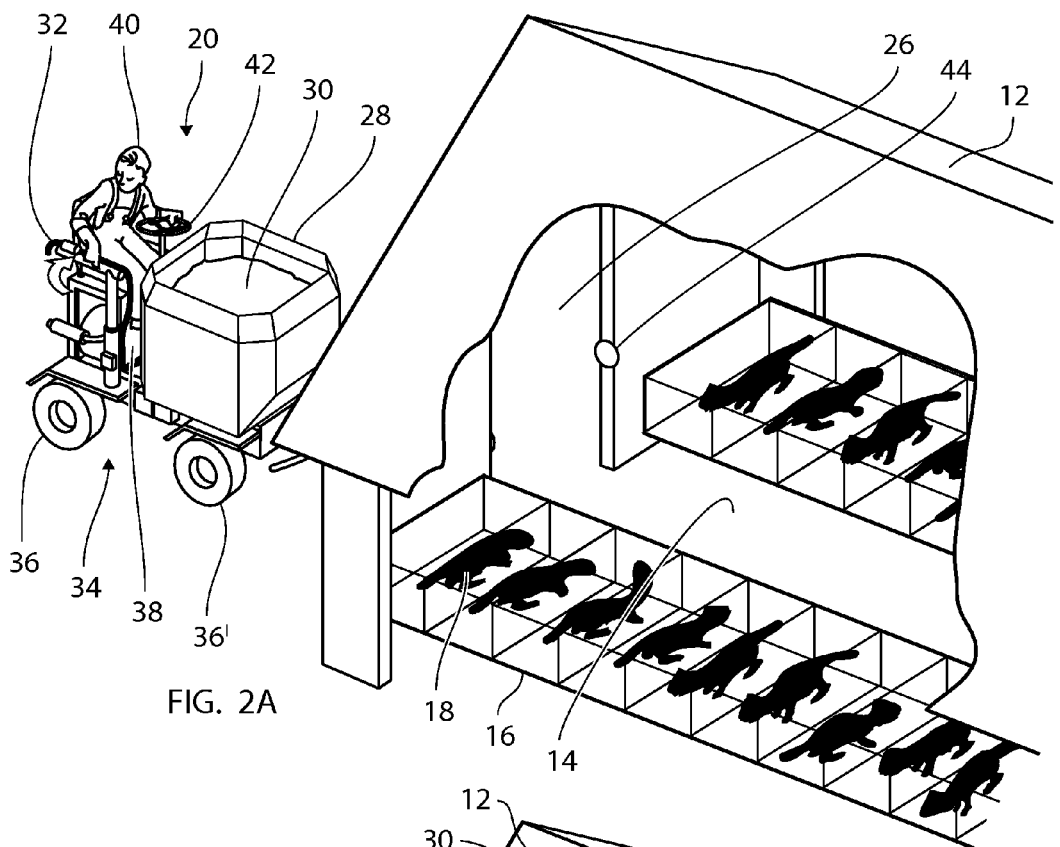
FIG. 2A-D is a series describing the motorized feeding vehicle in the first mode.

FIG. 2A shows a perspective view of a motorized feeding vehicle 20 entering a building 12 via an entrance 26. The motorized feeding vehicle 20 comprises an animal feeding system comprising a feed storage tank 28 filled by an animal feed 30 and a feeding pipe 32 for conveying the animal feed 30 from the feed storage tank 28 via a pump (not shown) to the exterior. The feeding pipe 32 is swingable between the present contracted state allowing the motorized feeding vehicle 20 to pass though the entrance, and an extended state which will be explained in detail below.

The motorized feeding vehicle 20 also comprises a power system 34 including four wheels 36 36' and a diesel engine 38. The present motorized feeding vehicle 20 is in a learn mode in which a user 40 controls the movement of the motorized feeding vehicle 20 via a control system and a steering system comprising a steering wheel 42 which controls the direction of the front wheels 36'. The entrance 26 of the building comprises an RFID tag 44 which will be explained in detail below. Also, each of the cages may comprise an RFID tag 44.

Figure 2B:
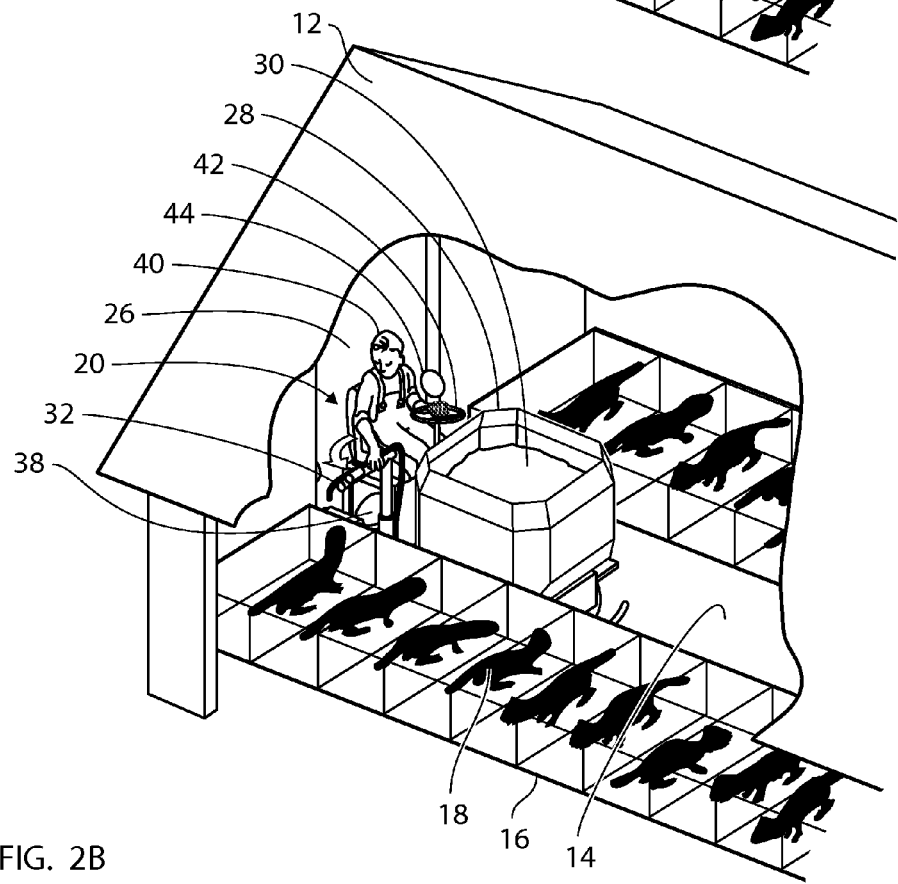

FIG. 2B shows a perspective view of a motorized feeding vehicle 20 when it has entered the building 12 via the entrance 26. The motorized feeding vehicle 20 is thus positioned in front of a cage 16 including one or more animals 18. The user 40 swings the feeding pipe 32 to the extended state partially extending partially above the cage 16.

Figure 2C:
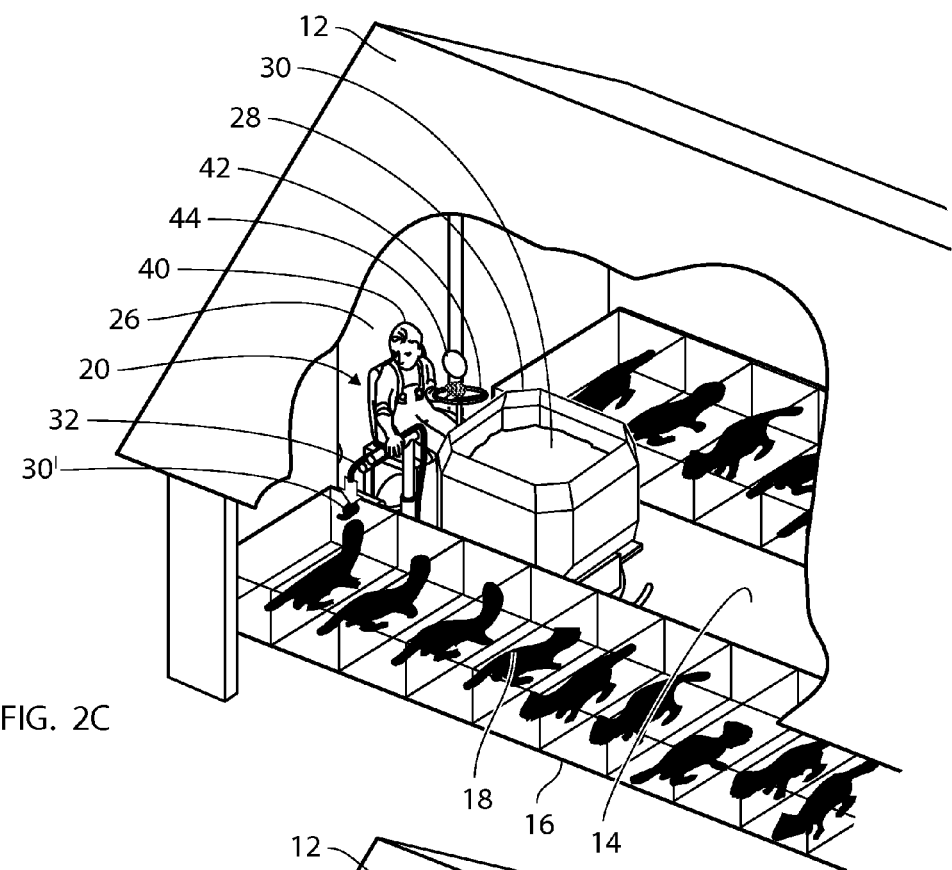

FIG. 2C shows a perspective view of a motorized feeding vehicle 20 when the user 40 has engaged the animal feeding system in order to convey animal feed 30 from the tank 28 onto the cage 16 via the feeding pipe 32.

Figure 2D:
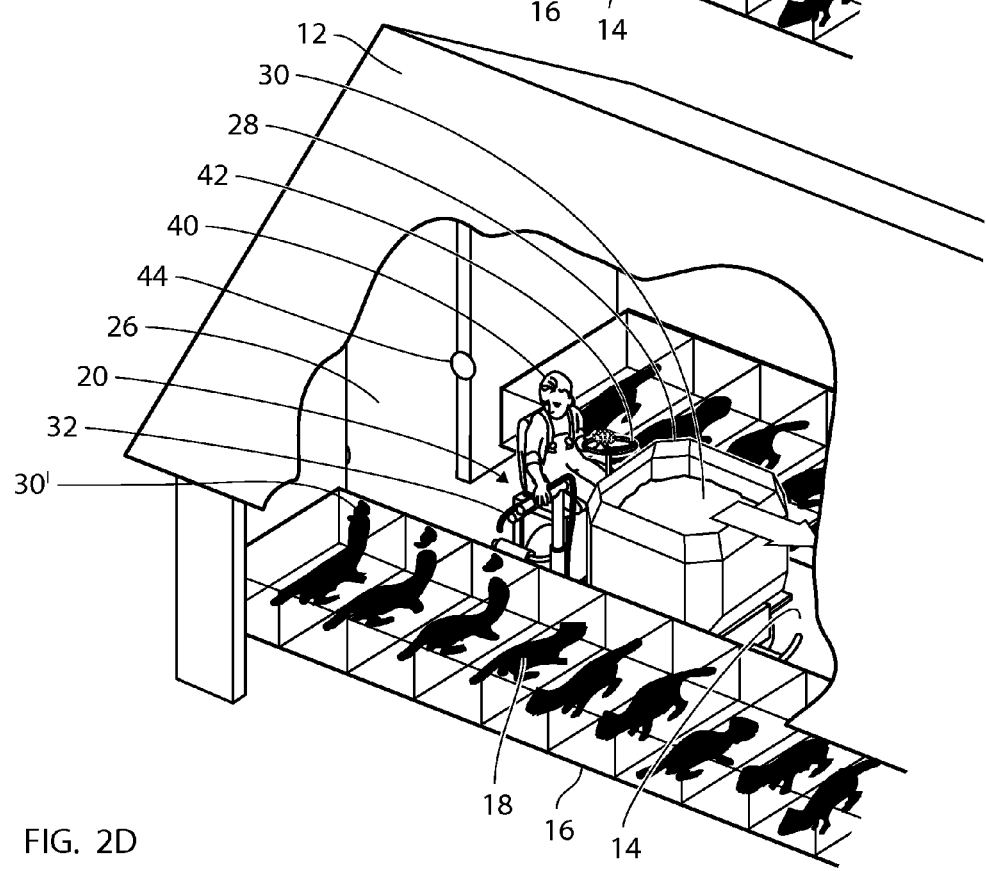

FIG. 2D shows a perspective view of a motorized feeding vehicle 20 when the user 40 drives along the passage 14 and delivers a specific amount of feed 30' to each of the cages 16 via the animal feeding system.

Figure 3:
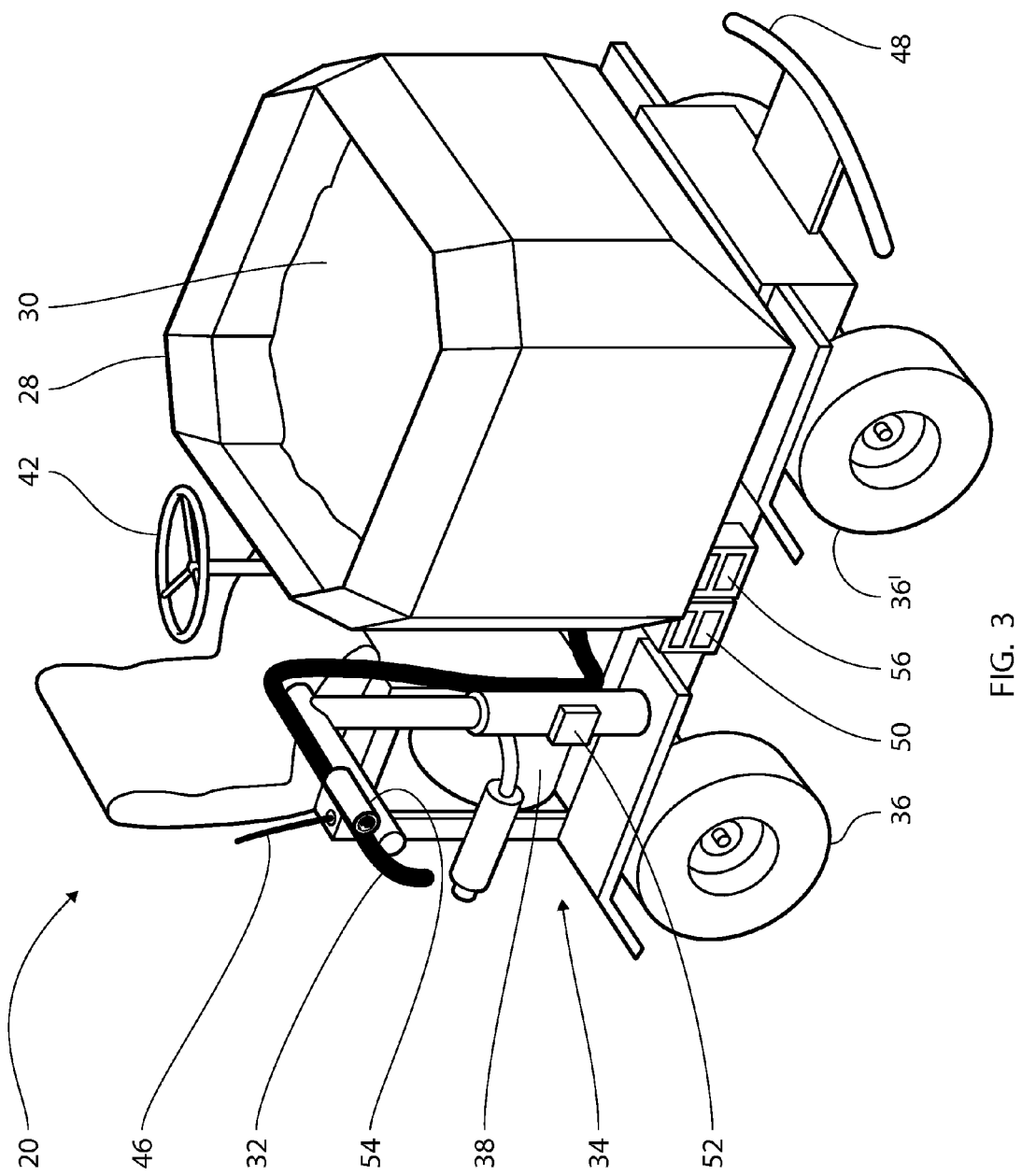
FIG. 3 is a perspective view of the motorized feeding vehicle.

FIG. 3 shows a close-up perspective view of the motorized feeding vehicle 20. The motorized feeding vehicle 20 comprises three navigation systems, optionally four, all using different technologies. The motorized feeding vehicle 20 comprises a satellite navigation system receiver (GPS receiver) 46 for generating a first set of parameters constituting location information from a satellite navigation system (not shown).

The motorized feeding vehicle 20 further comprises a proximity sensor 48, such as an IR/Laser sensor, for generating a second set of parameters constituting spatial information. The spatial information represents the location of nearby objects such as the walls, the cages and the entrance of the building of the animal farming system. Also, objects permanently present outside the building may be included in the spatial information, as well as object occasionally occurring in the path of the motorized feeding vehicle 20.

The motorized feeding vehicle 20 yet further comprises an internal position sensor 50 comprising a direction sensor and a velocity sensor for generating a third set of parameters constituting motion information. The motion information represents the velocity/acceleration/distance/direction traveled by the motorized feeding vehicle 20.

The information representing the amount of feed delivered to each cage by the feeding pipe 32 and the status of the feeding pipe may be stored as a fourth set of feeding parameters. In this way, the feeding may as well be performed automatically. The amount of feed delivered to each cage may be predetermined, inputted manually, or be determined in the learn mode.

The motorized feeding vehicle 20 further comprise an RFID reader 52 which detects nearby RFID tags used for localization. The information received from the RFID reader 52 of nearby RFID tags may be used for generating an optional fifth set of parameters which may be used for navigation.

The motorized feeding vehicle 20 may also include an IR camera 54 for detecting the presence or non-presence of an animal within the cage. The IR camera 54 may also be used for determining the number and the location of the animal(s) and the presence of any remaining feed in the cage. Further, the IR camera 54 may be used for determining the temperature of the animal. The temperature of the animal may be used for determining whether the animal is sick, i.e. has a fever, or other diseases as well as injuries. The information about the health status of the animal may be stored.

The motorized feeding vehicle 20 further comprises a control unit 56, which is connected to the satellite navigation system receiver 46, the proximity sensor 48, the internal position sensor 50, the feeding system, the RFID reader 52 and the IR camera 54. When the user is controlling the motorized feeding vehicle 20 via the user operated movement control system, the control unit 56 is in learn mode, in which all of the first, second, third, fourth and optionally fifth sets of parameters are recorded as data. Optionally, the IR camera data may be recorded as well. In case any sets of parameters cannot be properly received, they may be ignored.

When the control unit 56 is set to autonomous mode, the power system 34 and the steering system 42 are controlled by the control unit 56 based on the previously recorded data, including at least the first, second, and third sets of data. During autonomous mode, the control unit 56 continuously compares the recorded data with the continuously generated first, second, and third sets of parameters. In this way, the motorized feeding vehicle 20 may be navigated very accurately. In case more than one of the first, second and third sets of parameters are received, the navigation of the motorized feeding vehicle is based on a running average, a weighing algorithm or a Kalman filtering algorithm.

Figure 4A:
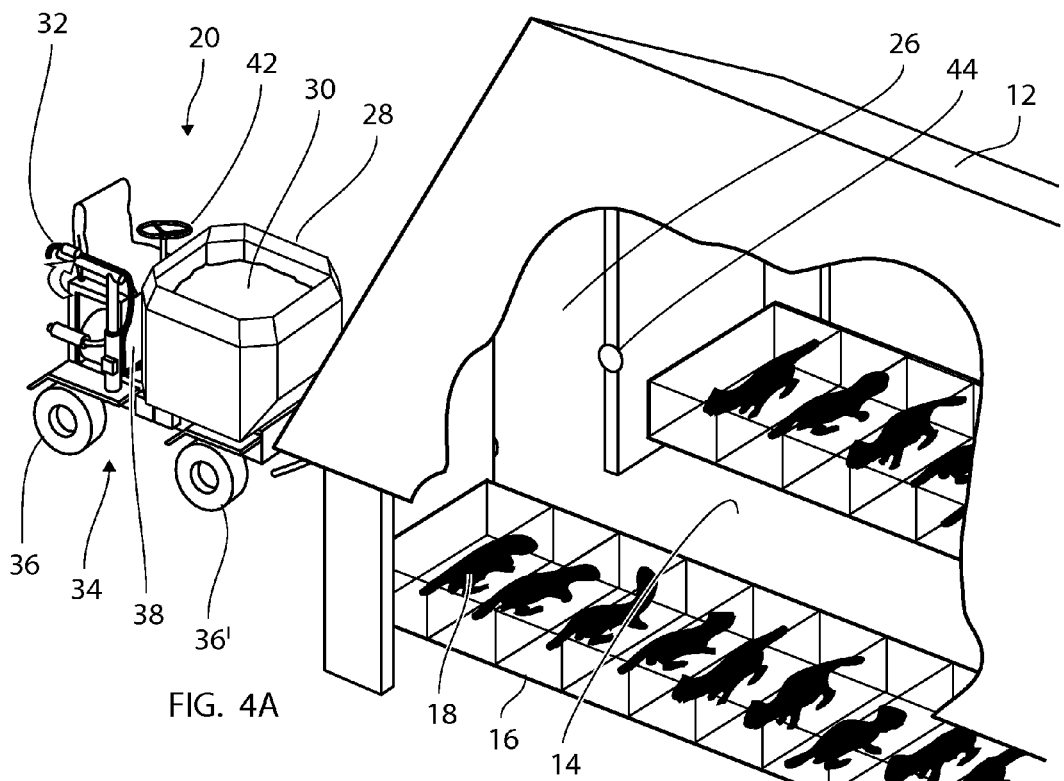
FIG. 4A-D is a series describing the motorized feeding vehicle in the second mode.

FIG. 4A shows a perspective view of a motorized feeding vehicle 20 in autonomous mode approaching the entrance 26. When outside the building 12 the control unit 56 uses primarily the first and second sets of parameters compared to the corresponding recorded data for continuously performing course corrections. The proximity sensor 48 may be used when avoiding occasional obstacle along the path of travel of the motorized feeding vehicle 20.

Figure 4B:
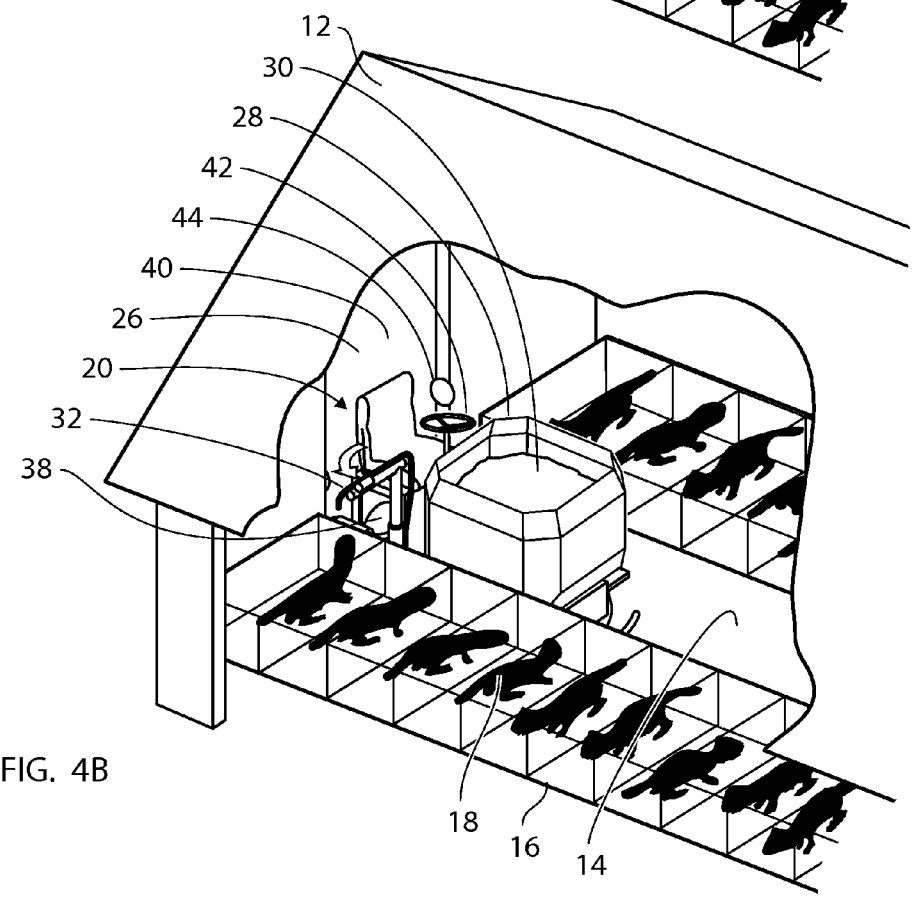

FIG. 4B shows a perspective view of a motorized feeding vehicle 20 in autonomous mode passing through the entrance 26. The third set of parameters and optionally the fifth set of parameters may be used in order to position the motorized feeding vehicle 20 correctly in the passage 14 of the building 20. At this point, the first set of parameters may be inaccurate and navigation may be performed based on the other sets of parameters only compared to the recorded data. Once the entrance 26 has been cleared, the feeding pipe 32 may be extended automatically and the feeding started based on the data of the recorded fourth set of parameters.

Figures 4C, 4D:
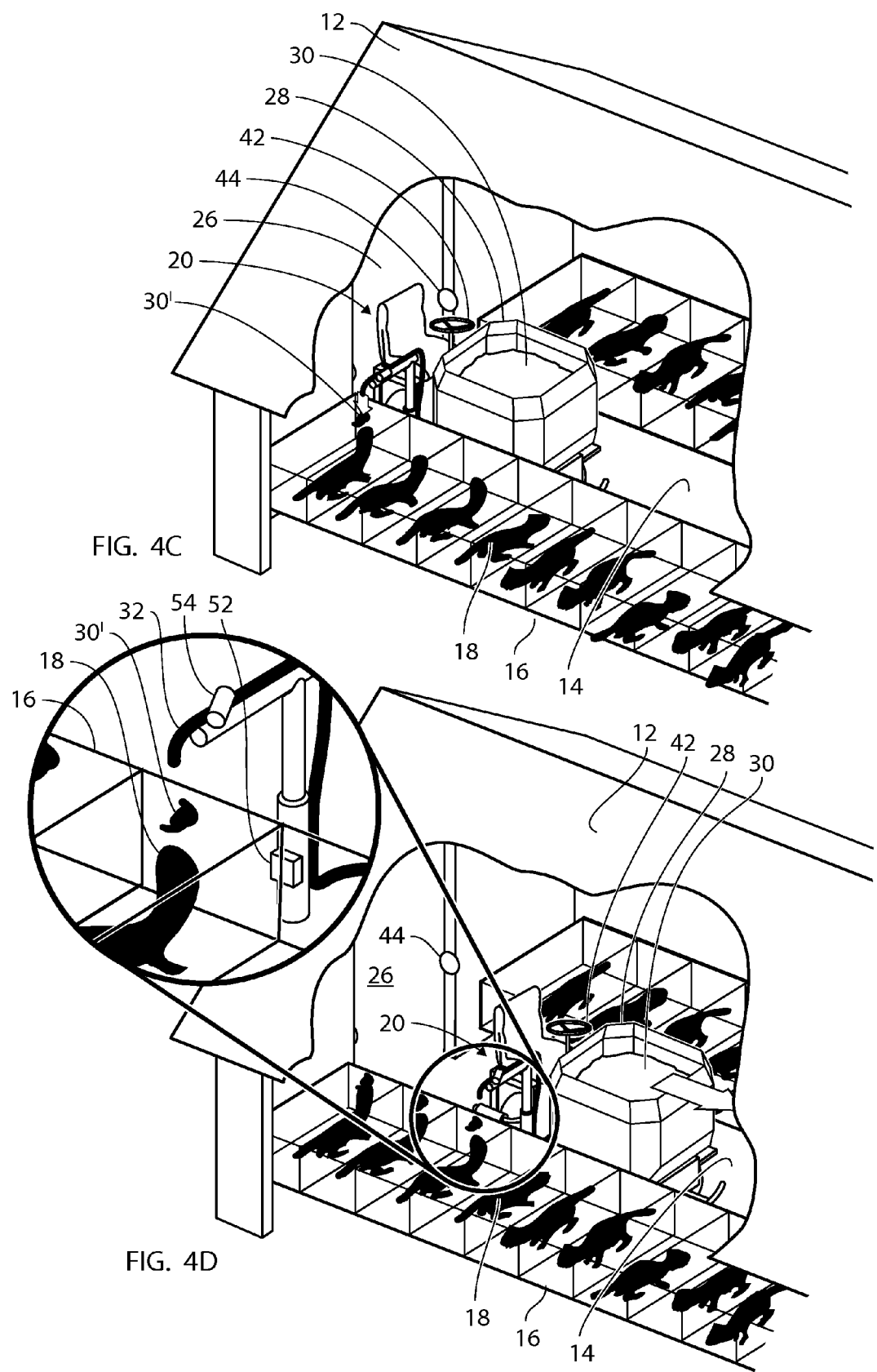

FIG. 4C shows a perspective view of a motorized feeding vehicle 20 in autonomous mode during feeding. The feeding of each animal 18 in the cages 16 may be based on the data of the fourth set of parameters previously recorded.

FIG. 4D shows a perspective view of a motorized feeding vehicle 20 in autonomous mode during movement in the passage 14 based on the comparison between the recorded data and the continuously recorded sets of parameters. Further, the IR camera 54 may be monitoring the status of the animal.

The feeding vehicle 20 will continue through the passage 14 and provide feed to the animals 18. When the feed tank 28 is empty, the feeding vehicle 20 may be programmed to autonomously return to a re-supply station being e.g. the maintenance shed 22 to be re-supplied. The maintenance shed 22 may include a silo (not shown) including animal feed for resupplying the feed tank 28 of the feeding vehicle 20. Alternatively, a separate silo building is provided to which the feeding vehicle 20 may move autonomously and at which the feed tank 28 may be resupplied. The motorized feeding vehicle 20 may use the satellite navigation system receiver 46 and the proximity sensor 48 when navigating to the re-supply station. When navigating back to the position at which the feed tank 28 was empty, also the internal position sensor 50 may be used.

Figure 5:
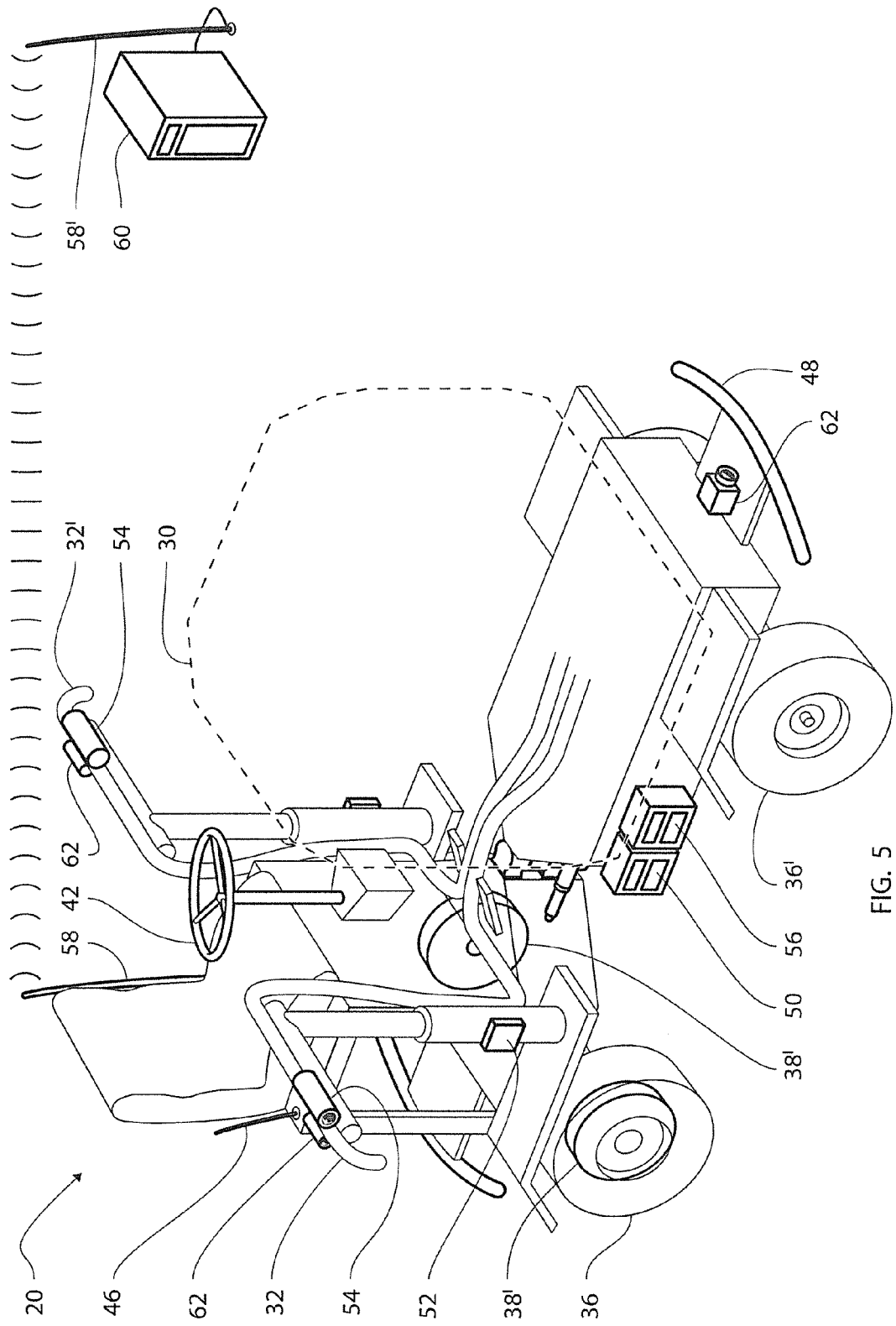
FIG. 5 is a perspective view of a further embodiment of the motorized feeding vehicle.

FIG. 5 shows a perspective view of an alternative embodiment of a motorized feeding vehicle 20 when communicating with a server 60 via antennas 58, 58' on the vehicle 20 and the server 60, respectively. The recorded data may be transmitted to the server 60 for use with other motorized feeding vehicles 20. The motorized feeding vehicle 20 may also comprise cameras 62 for use in controlling the motorized feeding vehicle 20 remotely. A second feeding pipe 32' may be provided on the opposite side of the vehicle from the first feeding pipe 32. The second feeding pipe 32 may include a second IR camera 54 and a second camera 62 for use in controlling vehicle movement.

The present motorized feeding vehicle 20 comprises electric motors 38' in all of the wheels 36 36' for driving the motorized feeding vehicle and replacing the diesel engine. The electric motor 38' is powered by a battery pack (not shown), which may be recharged at the maintenance shed 22. Further, the present motorized feeding vehicle 20 comprises an articulated steering mechanism.

Figure 6:
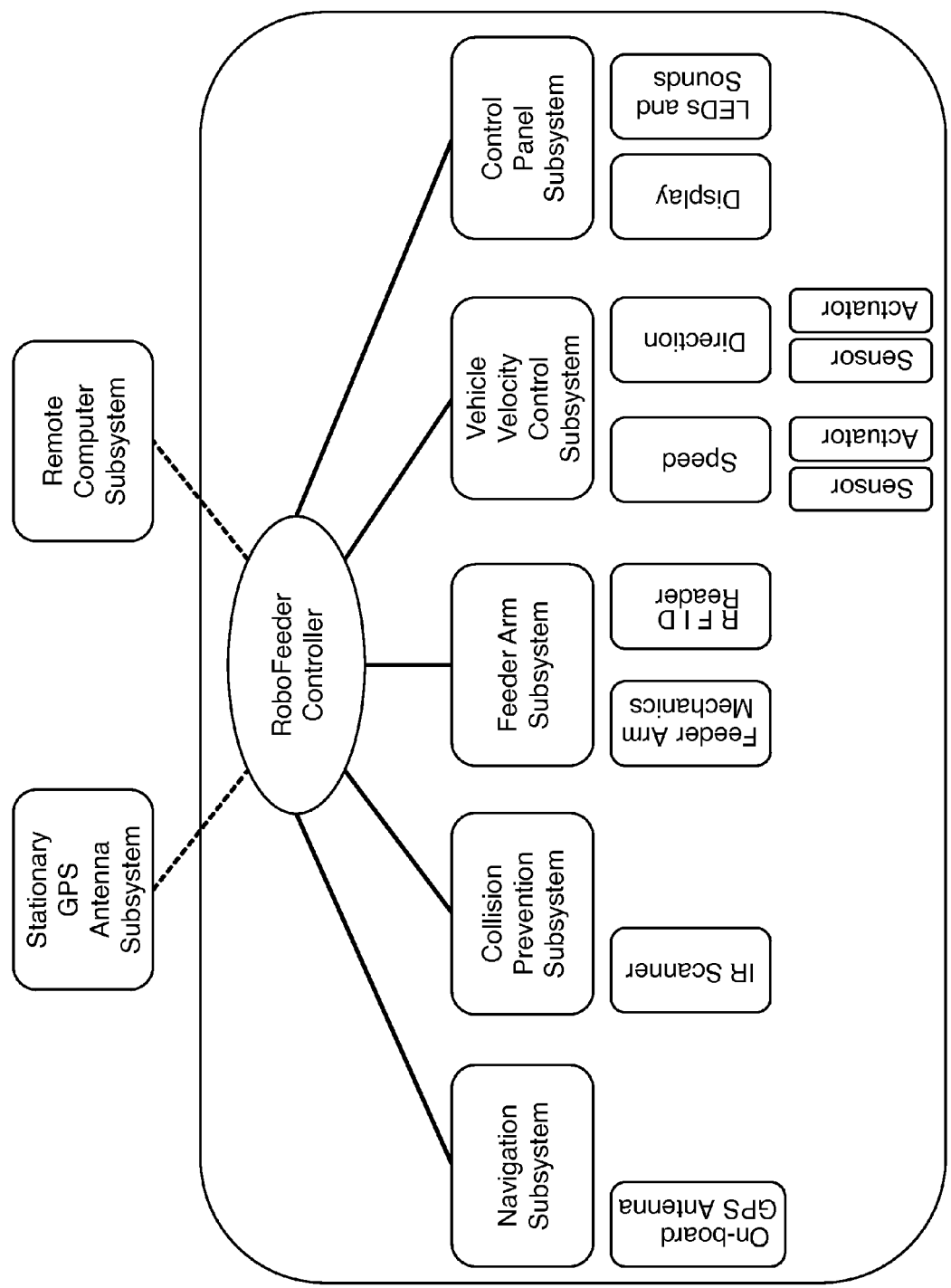
FIG. 6 is a chart illustrating the working principle of the control unit.

FIG. 6 shows a chart illustrating the working principle of the control unit. The RoboFeeder Controller subsystem, which may be provided as a retrofit kit for upgrading existing manually controlled motorized feeding vehicles to autonomous control, includes the following subsystems:
a) The Navigation Subsystem constituting the satellite navigation system receiver, which comprises an on board GPS antenna for receiving location information.
b) The Collision Prevention Subsystem constituting the proximity sensor including the IR scanner for providing spatial information.
c) The Feeder Arm Subsystem including the Feeder Arm mechanics and the RFID reader.
d) The Vehicle Velocity Control Subsystem including speed and direction systems.
e) The speed and direction systems comprising a respective sensor and actuator.
f) The Control Panel Subsystem comprising a display, LEDs and sound.

The RoboFeeder controller may optionally be connected to a stationary GPS subsystem and a remote computer subsystem.

Figure 7:
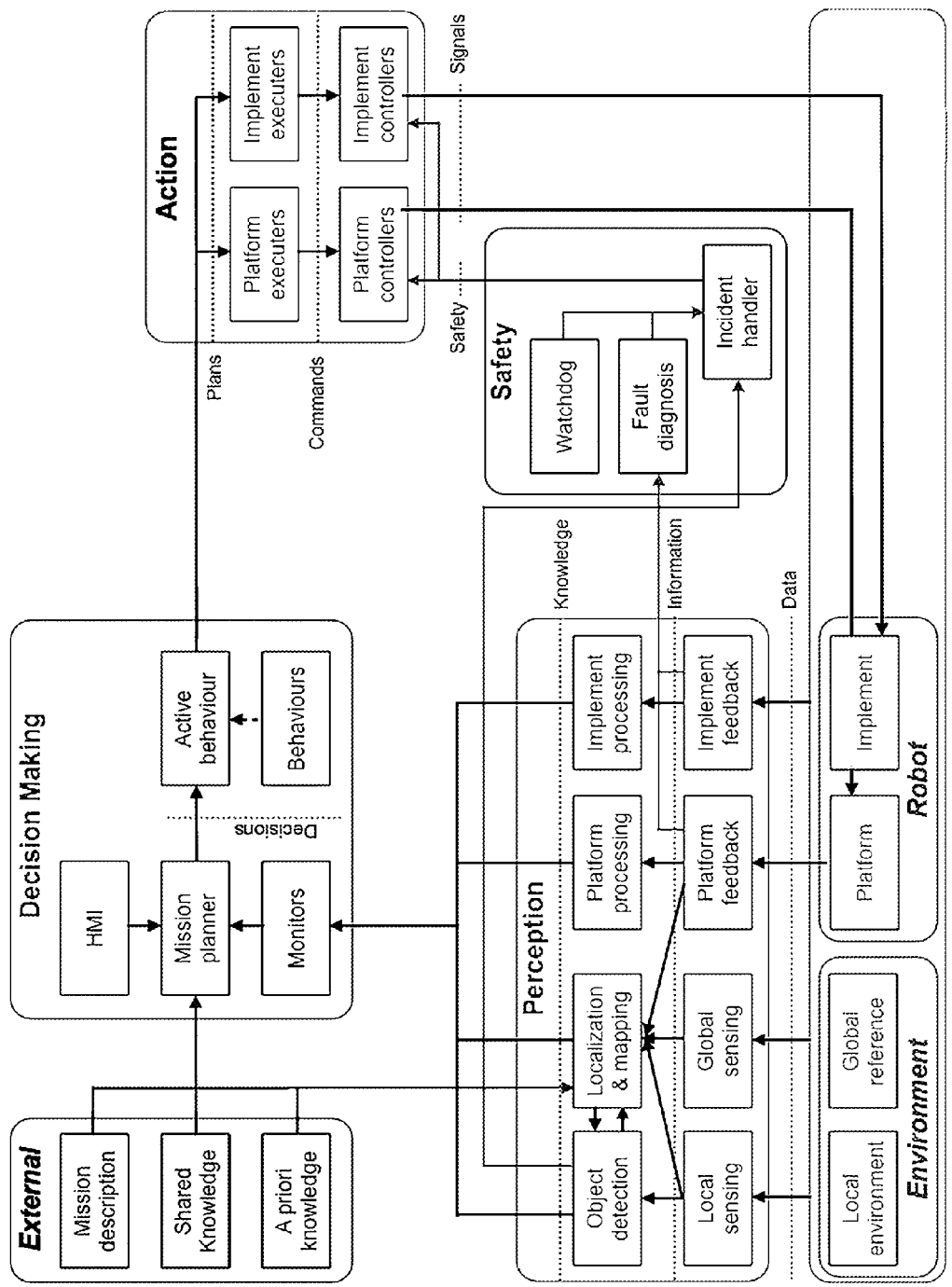
FIG. 7 is a flow chart illustrating the working principle of the motorized feeding vehicle.

FIG. 7 is a self explanatory flow chart illustrating the working principle of the motorized feeding vehicle.

Although the above animal farming system and motorized feeding vehicle has been described above with reference to specific embodiments, it is evident to the skilled person that numerous modifications are feasible, such as a semi-autonomous system in which the motorized feeding vehicle is moving autonomously, but where the user is controlling the feeding manually. Further, the user need not necessarily be controlling the motorized feeding vehicle while riding it; the user may also control the motorized feeding vehicle from another location via a remote control and cameras.

Further, the animal feeding system may include two or more motorized feeding vehicles operating at the same time. One motorized feeding vehicle may be used for the learn mode. The animal feeding system may thereafter be split up in sections wherein each motorized feeding vehicle operates in one of those sections.

LIST OF PARTS WITH REFERENCE TO THE FIGURES

10. Animal farming system
12. Building
14. Passage
16. Cages
18. Animal
20. Motorized feeding vehicle
22. Maintenance shed
24. Path
26. Entrance
28. Feed tank
30. Feed
32. Feeding pipe
32'. Second feeding pipe
34. Power system
36. Front wheel
38. Engine
40. User
42. Steering wheel
44. RFID tag
46. GPS receiver
48. Proximity sensor
50. Internal position sensor
52. RFID reader
54. IR camera
56. Control unit
58. WIFI antenna (vehicle)
58'. WIFI antenna (server)
60. Server
62. Surveillance camera

The invention claimed is:
1. A motorized feeding vehicle for an animal farming system, said animal farming system comprising a field having a building accommodating a plurality of cages, each cage adapted for accommodating one or more animals, preferably a furred animal, most preferably a mink, said motorized feeding vehicle comprising:
a power system operable for driving said motorized feeding vehicle;
a steering system operable for determining a direction of said motorized feeding vehicle;

a satellite navigation system receiver configured for generating a first set of parameters constituting location information from a satellite navigation system;

a proximity sensor configured for generating a second set of parameters constituting spatial information of an area adjacent said motorized feeding vehicle;

an internal position sensor, comprising a direction sensor and a velocity sensor, and configured for generating a third set of parameters constituting motion information;

an animal feeding system comprising a feed storage tank configured for storing animal feed and a feeding pipe configured for conveying said animal feed from said feed storage tank to said cages individually, said animal feeding system further comprising a feeding control system operable for controlled feeding or non-feeding said animals via said animal feeding system based on a fourth set of parameters constituting feeding parameters; and a control unit connected to said satellite navigation system for receiving said first set of parameters, to said proximity sensor for receiving said second set of parameters, to said internal position sensor for receiving said third set of parameters, and to said feeding control system for receiving said fourth set of parameters, said control unit defining:

a first mode constituting a learn mode in which a user is controlling said motorized feeding vehicle via said power system, said steering system, and said feeding control system, and in which said control unit records data representing said first set of parameters, said second set of parameters, said third set of parameters and said fourth set of parameters; and a second mode constituting an autonomous mode in which said control unit is controlling said power system, said steering system, and said animal feeding system by comparing said recorded data with said first set of parameters being generated by said satellite navigation system receiver, said second set of parameters being generated by said proximity sensor, said third set of parameters being generated by said internal position sensor, and said fourth set of parameters.

2. The motorized feeding vehicle according to claim 1, said motorized feeding vehicle comprising an electromagnetic reader for reading an identification device of each cage and/or each animal, said reader being selected from the group consisting of an RFID reader and an optical reader.

3. The motorized feeding vehicle according to claim 2, wherein at least one of said field and said building comprises an additional identification device for navigation.

4. The motorized feeding vehicle according to claim 1, wherein said motorized feeding vehicle includes a detector configured for determining the amount of feed present or not present in said cage, said detector being selected from the group consisting of a camera and an ultrasound detector.

5. The motorized feeding vehicle according to claim 1, wherein said proximity sensor comprises at least one of an IR sensor, radar, and a laser proximity sensor, wherein said proximity sensor is configured for detecting objects 0.5 m to 2.0 m from said motorized feeding vehicle.

6. The motorized feeding vehicle according to claim 1, wherein said data are exportable from said control unit and importable into said control unit.

7. The motorized feeding vehicle according to claim 1, wherein said control unit controls said power system and said steering system using an adaptive weighing algorithm using said recorded data, said first set of parameters, said second set of parameters, said third set of parameters, and said fourth set of parameters.

8. The motorized feeding vehicle according to claim 1, wherein said first set of parameters is ignored if said satellite navigation system receiver is not receiving navigation information from a sufficient amount of satellites, wherein said second set of parameters is ignored if said proximity sensor cannot detect any nearby objects, and wherein said third set of parameters is ignored if an onboard accelerometer detects loss of traction of said power system of said motorized feeding vehicle.

9. The motorized feeding vehicle according to claim 1, wherein said feeding pipe is movable in a rotational degree of freedom.

10. The motorized feeding vehicle according to claim 1, wherein said motorized feeding vehicle comprise a heat sensitive camera configured for determining a health status of said animals individually.

11. The motorized feeding vehicle according to claim 1, wherein said motorized feeding vehicle comprises a wireless communication unit configured for communicating any of said first set of parameters, said second set of parameters, said third set of parameters, said fourth set of parameters, and said data to at least one of a server, a computer, and a handheld device.

12. The motorized feeding vehicle according to claim 1, wherein said internal position sensor comprises at least one of an inertial navigation system, a compass, a sensor monitoring said steering system, and a sensor measuring an angular rotation of said power system of said motorized feeding vehicle.

13. A retrofit kit for a motorized feeding vehicle for an animal farming system, said animal farming system comprising a field having a building accommodating a plurality of cages, each cage adapted for accommodating one or more animals, preferably a furred animal, most preferably a mink, said motorized feeding vehicle comprising:

a power system operable for driving said motorized feeding vehicle;

a steering system operable for determining a direction of said motorized feeding vehicle; and an animal feeding system comprising a feed storage tank for storing animal feed and a feeding pipe for conveying said animal feed from said feed storage tank to said cages individually;

said retrofit kit comprising:

a satellite navigation system receiver configured for generating a first set of parameters constituting location information from a satellite navigation system;

a proximity sensor configured for generating a second set of parameters constituting spatial information of an area adjacent said motorized feeding vehicle;

an internal position sensor, comprising a direction sensor and a velocity sensor, and configured for generating a third set of parameters constituting motion information;

a feeding control system operable for user controlled feeding or non-feeding said animals via said animal feeding system and for establishing a fourth set of parameters constituting feeding parameters; and a control unit connected to said satellite navigation system for receiving said first set of parameters, to said proximity sensor for receiving said second set of parameters, to said internal position sensor for receiving said third set of parameters, and to said feeding control system for receiving said fourth set of parameters, said control unit defining:

a first mode constituting a learn mode in which a user is controlling said motorized feeding vehicle via said power system, said steering system, and said feeding control system, and in which said control unit records data representing said first set of parameters, said second set of parameters, said third set of parameters, and said fourth set of parameters; and a second mode constituting an autonomous mode in which said control unit is controlling said power system, said steering system, and said animal feeding system by comparing said recorded data with said first set of parameters being generated by said satellite navigation system receiver, said second set of parameters being generated by said proximity sensor, said third set of parameters being generated by said internal position sensor, and said fourth set of parameters.

14. A method of operating an animal farming system, said animal farming system comprising a field having a building accommodating a plurality of cages, each cage adapted for accommodating one or more animals, preferably a furred animal, most preferably a mink, said method comprising providing a motorized feeding vehicle, said motorized feeding vehicle comprising:

a power system operable for driving said motorized feeding vehicle;

a steering system operable for determining a direction of said motorized feeding vehicle;

a satellite navigation system receiver configured for generating a first set of parameters constituting location information from a satellite navigation system;

a proximity sensor configured for generating a second set of parameters constituting spatial information of an area adjacent said motorized feeding vehicle;

an internal position sensor, comprising a direction sensor and a velocity sensor, and configured for generating a third set of position parameters constituting motion information;

an animal feeding system comprising a feed storage tank configured for storing animal feed and a feeding pipe configured for conveying said animal feed from said feed storage tank to said cages individually, said animal feeding system further comprising a feeding control system operable for controlled feeding or non-feeding said animals via said animal feeding system based on a fourth set of parameters constituting feeding parameters; and a control unit, said control unit connected to said satellite navigation system for receiving said first set of parameters, to said proximity sensor for receiving said second set of parameters, to said internal position sensor for receiving said third set of parameters, and to said feeding control system for receiving said fourth set of parameters;

said method comprising the additional steps of:

moving said motorized feeding vehicle in a first mode constituting a learn mode, in which a user is controlling said motorized feeding vehicle via said power system, said steering system, and said feeding control system, and in which said control unit records data representing said first set of parameters, said second set of parameters, said third set of parameters, and said fourth set of parameters; and moving said motorized feeding vehicle in a second mode constituting an autonomous mode in which said control unit is controlling said power system, said steering system, and said animal feeding system by comparing recorded data with said first set of parameters being generated by said satellite navigation system receiver, said second set of parameters being generated by said proximity sensor, said third set of parameters being generated by said internal position sensor, and said fourth set of parameters.

* * * * *